United States Patent Office 3,200,182
Patented Aug. 10, 1965

3,200,182
PRODUCTION OF A STRESS-FREE POLY-
CARBONATE SHAPED ARTICLE
Wilhelm Hechelhammer, Krefeld-Bockum, and Hugo
Streib, Krefeld-Urdingen, Germany (both % Farben-
fabriken Bayer A.G., Krefeld-Urdingen, Germany)
No Drawing. Filed Jan. 4, 1962, Ser. No. 164,394
Claims priority, application Germany, Jan. 7, 1961,
F 32,919
4 Claims. (Cl. 264—235)

This invention relates generally to polycarbonate plastics, and more particularly to a method for making substantially stress-free shaped polycarbonate articles.

It has been proposed heretofore to prepare polycarbonate plastics such as, for example, in Canadian Patents 578,585 and 578,795 issued June 30, 1959, and Canadian Patent 594,805 issued March 22, 1960. One of the more popular methods of making polycarbonate plastics involves reacting a di(monohydroxyaryl)-alkane with a derivative of carbonic acid, such as carbonic acid diester or phosgene. It has been found that polycarbonate plastics can be shaped into various articles of commercial importance such as, for example, helmets, films, fibers, tubes and the like. However, the shaping of the polycarbonate plastic such as, for example, the extrusion of a tube or the molding of an article like a miner's helmet, frequently produces a product having high internal stresses. If the product has these internal stresses, it is not entirely satisfactory for some purposes and will frequently crack or break. This can be shown by subjecting a molded article having internal stresses to the action of certain organic fluids including hot mineral oil. Because of the liberation of the stresses when this is done, the article cracks or breaks into a multitude of pieces in a matter of seconds. It is possible to reduce the internal stresses of the shaped polycarbonate by heating or annealing it after shaping for a long period of time at a temperature of from about 120° C. to about 145° C. Usually about one hour of a heat treatment is required per millimeter wall thickness of the shaped article. Obviously, such a process is burdensome and not well suited for commercial practice.

It is an object of this invention to provide an improved method for making a substantially stress-free shaped polycarbonate plastic article. A more specific object of the invention is to provide a method for preparing a substantially stress-free shaped polycarbonate article without resorting to an extended heat treatment after shaping. A still further object of the invention is to provide a method for relieveng the stresses in a shaped polycarbonate article in a relatively short period of time.

Generally speaking, the foregoing objects and others are accomplished in accordance with this invention by heating a shaped polycarbonate article to a temperature of from about 300° C. to about 1200° C. for a short period of time. It has been found that substantially stress-free shaped polycarbonate bodies prepared from high molecular weight thermoplastic polycarbonate can be obtained by subjecting the shaped body for a short period of time to a temperature within the prescribed range. The heating of the polycarbonate article can be achieved by means of thermal radiation or by submerging the body in a suitable heated liquid or gas. The polycarbonate article heated in accordance with this invention has a highly glossy surface after treatment.

The length of the heat treatment required in accordance with this invention will vary with the temperature selected within the prescribed range. In any event it should not last so long that the polycarbonate melts appreciably. In most instances, the heat treatment will not need to last more than from about one or two seconds to a maximum of one minute.

It has been found that polycarbonate articles shaped in accordance with the process of this invention are substantially free from internal stresses as evidenced by the fact that they crack very little, if any, when dipped into organic fluids, such as hot mineral oil, or when they are dipped into surface active agents or other quenching or solubilizing fluids. The invention provides a method particularly advantageous for making safety helmets for miners or football players, electrical connectors, cups and saucers, nursing bottles for babies and the like.

A method of obtaining a substantially stress-free polycarbonate article in which the shaping is conducted while the polycarbonate is held in a surroundings with a temperature of from about 70° C. to about 120° C. and the freshly shaped article is maintained at a temperature within the same range is described in co-pending patent application Serial No. 93,306 filed by us on March 6, 1961, now Patent No. 3,155,756. In making a shaped polycarbonate article by an injection molding process according to that process, the mold is preheated to a temperature within the range set forth above and the mold is then charged with the polycarbonate. If, on the other hand, tubes are being made by an extrusion process, the product is subjected to the prescribed temperature by preheating the sizing die and immediately subjecting the product to an atmosphere of the prescribed temperature after it leaves the sizing die. In a process where a tube is made by a process where the tube after it is extruded is drawn through a vacuum sizing die and then a water bath to effect termination of the solidification of the polycarbonate, both the sizing die and the subsequent water bath are maintained at a temperature within the above defined limits. The polycarbonate at time of shaping is preferably at a temperature of above about 220° C.

A preferred embodiment of this invention involves a combination of the steps of shaping the polycarbonate article at a temperature of at least about 220° C. while in an atmosphere at a temperature within the range of from about 70° C. to about 120° C., maintaining the resulting article within a temperature of from about 70° C. to about 120° C. until the polycarbonate has solidified, and of heating the article thus produced to a temperature of from about 300 to 1200° C. to remove all of the stresses from the article.

Although the product provided by this invention is usually sufficiently stress-free for most purposes, it can be subjected, if desired, to a further heat treatment process of the type formerly used as the sole means of avoiding stresses. In other words, if desired to produce a product having optimum characteristics, the product of this invention can be subjected to a heat treatment or anneal at a temperature of from about 120° C. to about 145° C. after it has been subjected to 300° to 1200° C.

In order better to describe and further clarify the invention, the following are specific examples thereof:

*Example 1*

A polycarbonate plastic tube having an external diameter of about 18.4 mm. and a wall thickness of about 1.35 mm. thickness is continuously extruded through a suitable die using a worm extruder having a worm diameter of 30 mm. and a ring nozzle. The polycarbonate plastic used in making the tube has previously been prepared from phosgene and bis(hydroxy-phenyl) propane in accordance with the process described in Canadian Patent 578,585. The polycarbonate has a relative viscosity of 1.3 when measured in 0.5% methylene chloride solution at 25° C. The worm extruder is provided with five heaters numbered one through five beginning at the point where the polycarbonate plastic is charged therein. These heaters are maintained at a temperature of 290° C., 280° C., 270° C., 250° C. and 225° C. respectively. The worm is rotated at about 20 revolutions per minute and about 4 amps current are used. The tube is extruded at a rate of about 56 cm. per minute. After the emergence of the tube from the ring nozzle, it is passed through a suitable sizing die or calibration nozzle. The tube is then cooled with water indirectly and directly to about room temperature. After cooling, the tube is cut into pieces about 10 cm. long and these tubular pieces are then subsequently heat treated in accordance with this invention in a hot tube. The hot tube or tubular heating unit used for the heat treatment is a sheet metal mantel provided with an internal resistance wire heating element. The heating tube is rotated while the pieces to be heat treated are located near the center thereof. The temperature is maintained at about 335° C. for about thirty seconds. The tubular pieces heat treated in this way are then cooled at room temperature and placed in carbon tetrachloride along with similar tubular pieces which were not heat treated. Cracks appear in the untreated tubular pieces in about 20 seconds, but no cracks appear in the heat treated ones for several minutes. If the pieces are properly centered in the heating tube to insure uniform heating, it is not necessary to rotate the heating tube.

*Example 2*

A polycarbonate plastic tube is extruded as described in Example 1 except that immediately after the tube passes through the sizing die or calibration nozzle, it passes through a tube which is heated by means of hot water to about 87° C. and then through a tube heated by water indirectly to 87° C. This type of heat treatment is described more particularly in our above-identified copending application. The polycarbonate tube thus obtained is layer cut into pieces about 10 cm. long and these pieces are heat treated in a heated tube as described in Example 1 for 45 seconds at about 310° C. using about 200 volt current to produce the heating. The thus obtained polycarbonate tubes when subjected to carbon tetrachloride for 24 hours do not show any cracking because of stresses.

Some of the polycarbonate tubing produced in accordance with this example is not cut into pieces and is subsequently heat treated for 24 seconds in a hot tube at a temperature of 355° C. (220 volts) as described in Example 1. Pieces about 10 cm. long are cut from the tubing and after the cut ends have been heat treated for a short period to effect annealing, the tubing is submerged in carbon tetrachloride. No cracks appear after the tubes have been immersed in the carbon tetrachloride for 48 hours. A treatment of this type can be used in which the tubing is passed continuously from the shaping die through a heated tube.

*Example 3*

A polycarbonate tubing is prepared as described in Example 2, but this tubing is passed through hot water after it is passed through the sizing die to cool the tube to the temperature of about 87° C. Immediately after the tube passes from the device used to withdraw it from the die, the tube is passed through the flame of a ring burner which has been adjusted to insure uniform inpingement of the flames on the surface of the tube. The flame temperature is about 1200° C. The flames are so adjusted that the tube is not deformed during this treatment. A second device for pulling the tube is recommended in order that the tube will move evenly through the flame. If desired, it is possible to station the flame immediately before the device used for pulling the tube from the shaping die and it is possible to stretch the tube if desired. Pieces about 10 cm. long are cut from the tube and are submerged in carbon tetrachloride. No cracks can be detected after the pieces have been submerged in the carbon tetrachloride for 195 seconds. Pieces which have not been heat treated, but are cut from the same polycarbonate plastic tubing will show crack formation in from 50 to 80 seconds. The tubes which have been flame treated in accordance with this embodiment are still stable after 15 minutes in the carbon tetrachloride, but a few cracks do appear. The surface of the treated tube is glossy. The resistance of the tudes to cracking when submerged in carbon tetrachloride can be further increased by subjecting the inner surface of the tube to flame treatment as well as the outer surface. Such a treatment can be conducted continuously by placing a suitable burner in the center of the ring nozzle and subjecting the internal surface of the tubing at this point to the flame. The flame treatment of the surfaces of the tubes can be used alone or it can be used in combination with a heat treatment with water or a heated mantel as described in the other examples.

*Example 4*

Nursing bottles for babies, prepared by extruding a polycarbonate tube and then blowing the tube into the desired shape in a suitable mold will crack after about 60 seconds in carbon tetrachloride. After a relatively short time the bottle will break. If such nursing bottles are flame treated in accordance with the process described in Example 3, the crack formation and breaking of the bottle will not take place until after several hours in carbon tetrachloride.

It is to be understood that variations can be made in the foregoing embodiments and that various methods of heat treating the polycarbonate tube can be used. The tubing can be heated for example in an inert gas such as nitrogen or carbon dioxide, or it can be passed through hot water baths, or hot liquid baths of hydrocarbons or other non-solvents which do not attack or dissolve the polycarbonate. In addition, metals or metal alloys having a relatively low melting point can be used relieving the internal stresses in the polycarbonate tube. The heated liquids can be passed through the tubing or can be passed around the tubing to effect the heat treatment.

Still another method suitable for heat treating the polycarbonate articles is by means of induction current. For example, a core provided with an induction winding can be maintained by external magnets concentrically in the interior of the tube. In all embodiments of the invention, any heat treatment above the melting point of the polycarbonate should be so short that there will be no substantial melting of the plastic.

Alhough the invention has been described in considerable detail in the foregoing, it is to be understood that such detail is solely for the purpose of illustration and that many variations can be made by those skilled in the art without departing from the spirit and scope of the invention except as set forth in the claims.

Any other suitable polycarbonate can be substituted for the one in the foregoing examples. Polycarbonates which can be used in preparing articles to be treated in accordance with this invention are described in Canadian Patents 578,585 and 578,795. In fact, the invention is applicable to any polycarbonate prepared from a di(mono-hydroxide aryl)alkane and phosgene or a bis-(chloro carbonic acid) ester of a di(mono-hydroxide aryl)alkane. Since the invention here does not pertain to the preparation of the polycarbonate, but to the subsequent treatment thereof, reference is made to the Canadian patents and other published articles for the preparation of the polycarbonates. Thermoplastic film-forming polyester of carbonic acid and a di(mono-hydroxy aryl)alkane are preferred.

Other suitable high molecular weight thermoplastic polycarbonates are such which are prepared by methods well known in the art, for instance, from di-(monohydroxy-aryl)-ethers, -sulphides, -sulphones, and -sulphoxides, from mixtures of different di-(monohydroxy-aryl)-alkanes and their equivalents mentioned above and from mixtures thereof with other aromatic, aliphatic and cycloaliphatic dihydroxy compounds and from mixtures of other aromatic dihydroxy compounds such as hydroquinone, resorcinol, and dihydroxydiphenyls, and from mixtures thereof with aliphatic and cycloaliphatic dihydroxy compounds. The term polycarbonate means polymeric carbonic acid esters with an average molecular weight of at least about 10,000 and more up to about 200,000–300,000.

What is claimed is:

1. A method for stress relieving a shaped polycarbonate plastic which comprises exposing the shaped article to a temperature of from about 300° C. to about 1200° C. for a period of time less than that required for the polycarbonate to melt.

2. A method for making a substantially stress-free high molecular weight thermoplastic polycarbonate shaped article which comprises bringing the shaped article into surroundings having temperatures of from about 300° C. to about 1200° C. for a period of time of from about 1 to about 60 seconds so that substantially no melting of the polycarbonate occurs.

3. The process of claim 2 wherein the substantially stress-free polycarbonate shaped article is further treated at a temperature of from about 120 to about 145° C.

4. A method for making a substantially stress-free high molecular weight thermoplastic polycarbonate shaped article which comprises shaping the polycarbonate which is at a temperature of at least about 220° C. in an atmosphere having a temperature of from about 70° C. to about 120° C., maintaining the shaped article at a temperature of from about 70° C. to about 120° C. until the polycarbonate has substantially completely solidified and thereafter bringing the completely solidified shaped article into surroundings having a temperature of from about 300° C. to about 1200° C. for about 1 to about 60 seconds so that substantially no melting of the polycarbonate occurs.

References Cited by the Examiner

UNITED STATES PATENTS

| | | | |
|---|---|---|---|
| 2,373,093 | 4/45 | Baker | 18—48 |
| 2,402,221 | 6/46 | Wiley | 18—48 |
| 2,425,501 | 8/47 | Wiley | 18—48 |
| 2,514,088 | 7/50 | Pinsky | 18—48 |

ALEXANDER H. BRODMERKEL, *Primary Examiner.*

MICHAEL V. BRINDISI, *Examiner.*